US012261912B2

(12) United States Patent
Guzik et al.

(10) Patent No.: US 12,261,912 B2
(45) Date of Patent: Mar. 25, 2025

(54) DYNAMIC UTILIZATION OF MULTIPLE DEVICES

(71) Applicants: Getac Technology Corporation, New Taipei (TW); WHP Workflow Solutions, Inc., North Charleston, SC (US)

(72) Inventors: Thomas Guzik, Edina, MN (US); Muhammad Adeel, Edina, MN (US)

(73) Assignees: Getac Technology Corporation, New Taipei (TW); WHP Workflow Solutions, Inc., North Charleston, SC (US)

( * ) Notice: Subject to any disclaimer, the term of this patent is extended or adjusted under 35 U.S.C. 154(b) by 0 days.

(21) Appl. No.: 17/962,193

(22) Filed: Oct. 7, 2022

(65) Prior Publication Data

US 2024/0121303 A1    Apr. 11, 2024

(51) Int. Cl.
*H04L 67/12*    (2022.01)
*H04W 84/12*    (2009.01)

(52) U.S. Cl.
CPC ............. *H04L 67/12* (2013.01); *H04W 84/12* (2013.01)

(58) Field of Classification Search
CPC ............................... H04L 67/12; H04W 84/12
See application file for complete search history.

(56) References Cited

U.S. PATENT DOCUMENTS

| 10,250,732 | B2 * | 4/2019 | Zhang | H04M 19/04 |
| 2014/0189036 | A1 * | 7/2014 | Bhatia | H04L 47/25 |
| | | | | 709/224 |
| 2014/0297838 | A1 | 10/2014 | Qureshi | |
| 2017/0119966 | A1 | 5/2017 | Moberg et al. | |
| 2017/0163795 | A1 * | 6/2017 | Kuang | H04M 1/72463 |
| 2020/0204963 | A1 | 6/2020 | Park et al. | |
| 2021/0058179 | A1 * | 2/2021 | Bowler | H04W 52/0219 |
| 2021/0176617 | A1 * | 6/2021 | Han | H04W 52/028 |
| 2021/0344446 | A1 | 11/2021 | Zou et al. | |

FOREIGN PATENT DOCUMENTS

| CN | 107957687 A | * | 4/2018 | ............. G05B 15/02 |
| KR | 10-2015-0080868 A | | 7/2015 | |

* cited by examiner

*Primary Examiner* — Kostas J Katsikis
(74) *Attorney, Agent, or Firm* — Finnegan, Henderson, Farabow, Garrett & Dunner, L.L.P.

(57) ABSTRACT

Methods, systems, and apparatus, including computer programs encoded on a computer storage medium, to dynamically utilize multiple devices are disclosed. In one aspect, a method includes the actions of receiving, by a first computing device, data indicating a first function of a second computing device. The actions further include receiving, by the first computing device, data indicating a second function of a third computing device. The actions further include determining, by the first computing device, that the first function of the second computing device and the second function of the third computing device perform a same function. The actions further include generating, by the first computing device, an instruction for the third computing device to disable the second function. The actions further include providing, for output by the first computing device and to the third computing device, the instruction for the third computing device to disable the second function.

20 Claims, 3 Drawing Sheets

DYNAMIC UTILIZATION OF MULTIPLE DEVICES

TECHNICAL FIELD

This specification generally relates to remotely controlling the functionality of devices.

BACKGROUND

Police officers carry various types of equipment on their person and in their vehicles. Each of these devices may perform various functions. For example, a body camera may be configured to record audio and video. A radio may be configured to transmit and receive audio. A mobile phone may be configured to transmit and receive data over a network.

SUMMARY

A police officer carries multiple devices on his or her person in the course of duty. These devices form a personal area network for the officer. Each of these devices has a set of functionalities and a power source to carry out these functions. To some degree or another, these devices may often provide overlapping functionality. Operating the devices at full or near full functionality may result in duplicative services, some of which may be unused. This may cause unnecessary power drain on these devices, especially for those that are battery powered.

A hub is communicatively coupled to the various devices in the officer's personal area network. The hub is aware of the functionality of the various devices in the personal area network and may also be aware of the power sources and usage rates of the various devices when all or some functions are operating. The hub may be located in a vehicle of the officer or on the officer's person. The hub may communicate with the various devices to control when their various services are needed or not needed. Doing so may preserve battery life of the devices by powering down the functionality of a device and utilizing the functionality of another device. The hub may also serve as a communication hub so that the devices may communicate with the hub using a low power communication technique, and the hub can communicate with other devices and networks that require greater power. This may allow the devices to operate in a low-power mode to preserve battery power. In some instances, the hub may select the device for utilization of a common functionality based on which device may perform the function better than other device as may be the case if, for example, different image sensors have different resolutions. In some instances, the hub may select the device for utilization of a common functionality based on remaining battery capacity and/or which devices may likely to be needed in the future.

An innovative aspect of the subject matter described in this specification may be implemented in methods that include the actions of receiving, by a first computing device, data indicating a first function of a second computing device; receiving, by the first computing device, data indicating a second function of a third computing device; determining, by the first computing device, that the first function of the second computing device and the second function of the third computing device perform a same function; based on determining that the first function of the second computing device and the second function of the third computing device perform the same function, generating, by the first computing device, an instruction for the third computing device to disable the second function; and providing, for output by the first computing device and to the third computing device, the instruction for the third computing device to disable the second function.

These and other implementations can each optionally include one or more of the following features. The actions further include, based on providing, for output to the third computing device, the instruction for the third computing device to disable the second function, generating, by the first computing device, a notification for the second computing device indicating that the third computing device received an instruction to disable the second function that performs the same function as the first function of the second computing device. The actions further include receiving, by the first computing device, data indicating first characteristics of the second computing device and data indicating second characteristics of the third computing device; and based on the first characteristics of the second computing device, the second characteristics of the third computing device, and determining that the first function of the second computing device and the second function of the third computing device perform the same function, determining, by the first computing device, to generate the instruction for the third computing device to disable the second function.

The actions further include receiving, by the first computing device, data indicating first characteristics of the second computing device and data indicating second characteristics of the third computing device; based on the first characteristics of the second computing device, the second characteristics of the third computing device, and determining that the first function of the second computing device and the second function of the third computing device perform the same function, determining, by the first computing device, to generate an instruction for the third computing device to enable the second function and an instruction for the second computing device to disable the first function; providing, for output by the first computing device and to the second computing device, the instruction for the second computing device to disable the first function; and providing, for output by the first computing device and to the third computing device, the instruction for the third computing device to enable the second function.

The actions further include determining, by the first computing device, characteristics of the first computing device; based on the characteristics of the first computing device, determining, by the first computing device, to transfer a function of the first computing device to a fourth computing device; and providing, for output by the first computing device and to the fourth computing device, an instruction for the fourth computing device to begin performing the function. The actions further include receiving, by the first computing device, data indicating a third function of the second computing device; receiving, by the first computing device, data indicating a fourth function of the third computing device; determining, by the first computing device, that the third function of the second computing device and the fourth function of the third computing device perform a same additional function; based on determining that the third function of the second computing device and the fourth function of the second computing device perform the same additional function, generating, by the first computing device, an instruction for the third computing device to adjust performance of fourth function; and providing, for output by the first computing device and to the third computing device, the instruction for the third computing device to adjust performance of the fourth function.

The actions further include determining, by the first computing device, a context of the first computing device, the second computing device, or the third computing device; and based on the context of the first computing device, the second computing device, or the third computing device and determining that the first function of the second computing device and the second function of the third computing device perform the same function, determining, by the first computing device, to generate the instruction for the third computing device to disable the second function.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. The hub manages connected devices in a personal area network, including suspending and activating functionality of each device in accordance with any given context and other factors. The hub maintains a messaging broker to communicate with the connected devices. The hub maintains functionality of the personal area network.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
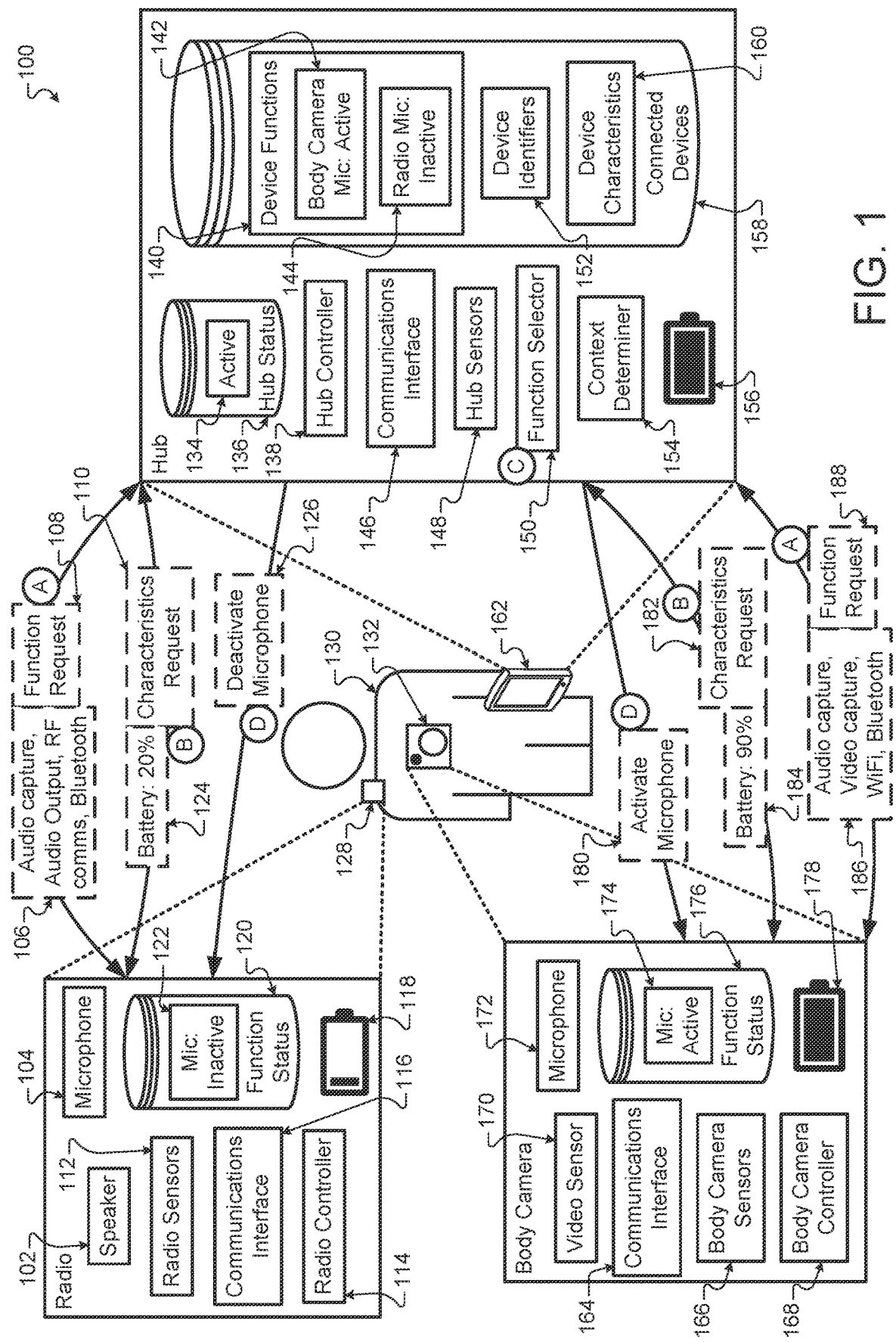
FIG. 1 illustrates an example system that is configured to manage the functionality of various devices.

FIG. 1 illustrates an example system 100 that is configured to manage the functionality of various devices. Briefly, and as described in more detail below, the user 130 may be utilizing multiple devices. These devices may include a body camera 132, a radio 128, and a mobile phone 162. The mobile phone 162 may operate as a hub that is configured to manage the operations of the body camera 132, the radio 128, and any other connected devices. The mobile phone 162 may determine the various functions of the body camera 132 and the radio 128 and determine that some of the functions achieve similar results. Based on this determination, the mobile phone 162 may instruct one of the devices to stop performing one of those functions by deactivating a hardware or software component of the device. FIG. 1 includes various stages A through D that may illustrate the performance of actions and/or the movement of data between various components of the system 100. The system 100 may perform these stages in any order.

In more detail, the user 130 may be a police officer who is carrying various types of equipment in the vehicle of the user 130 and the body of the user 130. The equipment may include a radio 128 that includes a microphone 104, a speaker 102, and a communications interface 116. The communications interface 116 may be configured to transmit and receive voice communications using various techniques. These techniques may include radio frequency communications, Wi-Fi, short range radio, cellular communications, and/or any other similar wireless or wired communication technique. The microphone 104 may be configured to detect audio and transmit that audio to the communications interface 116. The communications interface 116 may output the audio data to another radio and/or a communications network. The speaker 102 may be configured to receive audio data from the communications interface 116 and output the audio data.

The radio 128 may include radio sensors 112 that are configured to detect various characteristics of the radio 128 and/or the environment of the radio 128. For example, the radio sensors 112 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The radio 128 may include a battery 118 to provide power to the various components. The radio 128 may be configured to receive power from another device such as a power supply, power adapter, and/or any other similar device. This power may be used to charge the battery 118. In some implementations, the radio 128 may provide the power to the various components of the radio 128.

The radio 128 may include a radio controller 114 that is configured to manage the various components of the radio 128. The radio controller 114 may be implemented by one or more processors executing software stored on a storage device accessible by the processors. The radio controller 114 may manage the processing of the audio data detected by the microphone before and during the communications interface 116 outputting of the processed audio data. The radio controller 114 may manage the processing of audio data received through the communications interface 116 before and during the speaker 102 outputting the received audio data. The radio controller 114 may receive the sensor data from the radio sensors 112 and provide the sensor data to the various destinations that may include the communications interface 116.

In some implementations, the radio controller 114 may be configured to control whether any of the components are active or not. For example, the radio controller 114 may be configured to deactivate the microphone 104. Deactivating the microphone 104 may prevent the microphone 104 from detecting audio. The radio controller 114 may deactivate the speaker 102 that may prevent the speaker 102 from outputting audio. The radio controller 114 may deactivate one or more of the radio sensors 112 that may prevent the deactivated radio sensor from generating sensor data. The radio controller 114 may also reactivate any of the deactivated components. The radio controller 114 may also control the techniques that the communications interface 116 may use to communicate with other devices. For example, the radio controller 114 may deactivate the Wi-Fi feature of the communications interface 116. The radio controller 114 may store the activation status of the various components in the function status 120. The function status 120 may be implemented in a storage device that is accessible by the radio controller 114.

The equipment that the user 130 may carry may also include a body camera 132. The body camera 132 may be located on the chest of the user 130. The body camera 132 may include a video sensor 170, a microphone 172, and a communications interface 164. The communications interface 164 may be configured to transmit and receive communications using various techniques. These techniques may include radio frequency communications, Wi-Fi, short range radio, cellular communications, and/or any other similar wireless or wired communication technique. The microphone 172 may be configured to detect audio. The video sensor 170 may be configured to generate video data. The microphone 172 and the video sensor 170 may be configured to output the audio and video data to a storage device and/or a communications network using the communications interface 164. The storage device may be located on or accessible by the body camera 132.

The body camera 132 may include body camera sensors 166 that are configured to detect various characteristics of the body camera 132 and/or the environment of the body camera 132. For example, the body camera sensors 166 may include an accelerometer, a gyroscope, a GPS receiver, a barometer, an ambient light sensor, a compass, a gravity sensor, a proximity sensor, a magnetometer, hygrometer, water sensor, solar flux sensor, ultraviolet light detector, and/or any other similar sensors. The body camera 132 may include a battery 178 to provide power to the various components. The body camera 132 may be configured to receive power from another device such as a power supply, power adapter, and/or any other similar device. This power may be used to charge the battery 178. In some implementations, the body camera 132 may provide the power to the various components of the body camera 132.

The body camera 132 may include a body camera controller 168 that is configured to manage the various components of the body camera 132. The body camera controller 168 may be implemented by one or more processors executing software stored on a storage device accessible by the processors. The body camera controller 168 may manage the processing of the audio data detected by the microphone 172 before and during the communications interface 164 outputting of the processed audio data and/or storing the audio data. The body camera controller 168 may mange the processing of video data generated by the video sensor 170 before and during the communications interface 164 outputting of the processed video data and/or storing the video data. The body camera controller 168 may receive the sensor data from the body camera sensors 166 and provide the sensor data to the various destinations that may include the communications interface 164.

In some implementations, the body camera controller 168 may be configured to control whether any of the components are active or not. For example, the body camera controller 168 may be configured to deactivate the microphone 172. Deactivating the microphone 172 may prevent the microphone 172 from detecting audio. The body camera controller 168 may deactivate the video sensor 172 that may prevent the video sensor 172 from generating video data. The body camera controller 168 may deactivate one or more of the body camera sensors 166 that may prevent the deactivated body camera sensor from generating sensor data. The body camera controller 168 may also reactivate any of the deactivated components. The body camera controller 168 may also control the techniques that the communications interface 164 may use to communicate with other devices. For example, the body camera controller 168 may deactivate the short range radio feature of the communications interface 164. The body camera controller 168 may store the activation status of the various components in the function status 176. The function status 176 may be implemented in a storage device that is accessible by the body camera controller 168.

The equipment that the user 130 may carry may also include a mobile phone 162. The mobile phone 162 may include various components that facilitate the mobile phone 162 operating as a hub that manages the various components that the user 130 carries and the various components that the user 130 utilizes but may not carry. In this way, the mobile phone 162 may manage the personal area network of the user 130. The personal area network may include the mobile phone 162, the radio 128, the body camera 132, and any other devices that mobile phone 162 may be able to manage. The mobile phone 130 includes a hub controller 138. The hub controller 138 may be implemented by one or more processors executing software stored on a storage device accessible by the processors. The hub controller 138 may be configured to manage the various components of the mobile phone 162. The components may include a communications interface 146, hub sensors 148, a function selector 150, and a context determiner 154. The communications interface 146 may be configured to transmit and receive data using various techniques. These techniques may include radio frequency communications, Wi-Fi, short range radio, cellular communications, and/or any other similar wireless or wired communication technique. The hub controller 138 may be configured to instruct the communications interface 146 to utilize a particular communications technique and/or prevent communications using a particular communications technique. For example, the hub controller 138 may instruct the communications interface 146 to deactivate the cellular communications. As another example, the hub controller 138 may instruct the communications interface 146 to only utilize short range radio.

The hub sensors 148 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub controller 138 may be configured to activate or deactivate any of the hub sensors 148. The hub controller 138 may also be configured to provide the hub sensor data to the communications interface 146 for output, to a storage device, and/or to another component of the mobile phone 162 for further processing.

The context determiner 154 may be configured to determine the context of the mobile phone 162, any other devices communicating with the mobile phone 162, and/or the user 130. The context determiner 154 may analyze the hub sensor data, the radio sensor data, the body camera sensor data, audio data from the radio 128, function data from the radio 128, function data from the body camera 132, video and audio data from the body camera 132, and/or additional data from other devices. The context determiner 154 may determine a likely context of the mobile phone 162 and/or any other devices communicating with the mobile phone 162 based on this analysis. The context may indicate the likely actions in which the user 130 may be participating, the activities that may likely be occurring around the user 130, the likely path of the user 130, the weather around the user 130, and/or any other similar context.

The hub controller 138 may maintain a record of the devices that the hub controller 138 manages. This record may include identifiers for each of the devices and data related to each device such as the characteristics of the devices and the functions of the devices. The mobile phone 162 may include a connected devices storage 158. The connected devices storage 158 may implemented in a storage device that is accessible by the hub controller 138. The connected devices storage 158 may include the device identifiers 152. The device identifiers 152 may include data identifying each of the devices that the mobile phone 162 is managing. In the example of FIG. 1, the device identifiers 152 may include data identifying the body camera 132 and data identifying the radio 128.

The connected devices storage 158 may include the device characteristics 160 and the device functions 140 for the devices referenced in the device identifiers 152. The device functions 140 may include data related to the capabilities of the corresponding devices. The device functions 140 may be related to the tasks that the corresponding device is configured to perform. The device may perform the function using hardware and/or software. In some implementations, the hub controller 138 may request that devices indicate, to the mobile phone 162, the functions that the corresponding devices are capable of performing. In some implementations, the devices may provide an indication of their corresponding functions upon connecting to the mobile phone 162. In some implementations, the devices may provide an indication of their corresponding functions upon an update to the functions of the device. For example, if a device receives a software update that allows the device to perform a new function, then the device may provide an indication to the mobile phone 162 indicating the new function. If a device loses a function, then the device may provide an indication to the mobile phone 162 indicating the lost function.

The device characteristics 160 may be related to the aspects of the devices that change more frequently than the functions. In some implementations, the device characteristics 160 may be related to the aspects of the devices that are not related to the devices performing an action. In some implementations, the device functions 140 may be related to the functions of the devices that may change with changes in hardware and/or software, and the device characteristics 160 may be other aspect of the devices.

In stage A, the hub controller 138 may access the device identifiers 152 and determine that the radio 128 and the body camera 132 are communicating with the mobile phone 162. The hub controller 138 may determine that the device functions 140 may not include the functions of the radio 128 and the body camera 132. In some implementations, the hub controller 138 may determine that the device functions 140 for the radio 128 and the body camera 132 have not been updated in a threshold period of time. The hub controller 138 may generate a function request 108 and provide the function request 108 to the communications interface 146 along with instructions to provide the function request 108 to the radio 128. The communications interface 146 transmits the function request 108 to the radio 128. The communications interface 116 receives the function request 108 and provides the function request 108 to the radio controller 114. The radio controller 114 determines that the functions of the radio 128 include the ability to capture audio, output audio, communicate using RF communications, and communicate using short range radio. The radio controller 114 may generate the function response 106 that indicates these functions. The radio controller 114 may provide function response 106 to the communications interface 116 that then provides the function response 106 to the communications interface 146 of the mobile phone 162. The hub controller 138 stores the function response 106 in the device functions 140. The device functions 140 then indicate that the radio 128 has the functions of capturing audio, outputting audio, communicating using RF communications, and communicating using short range radio.

The hub controller 138 may generate a function request 188 and provide the function request 188 to the communications interface 146 along with instructions to provide the function request 188 to the body camera 132. The communications interface 146 transmits the function request 188 to the body camera 132. The communications interface 164 receives the function request 188 and provides the function request 188 to the body camera controller 168. The body camera controller 168 determines that the functions of the body camera 132 include the ability to capture audio, capture video, communicate using Wi-Fi, and communicate using short range radio. The body camera controller 168 may generate the function response 186 that indicates these functions. The body camera controller 168 may provide function response 186 to the communications interface 164 that then provides the function response 186 to the communications interface 146 of the mobile phone 162. The hub controller 138 stores the function response 186 in the device functions 140. The device functions 140 then indicate that the body camera 132 has the functions of capturing audio, capturing video, communicating using Wi-Fi, and communicating using short range radio.

In stage B, the hub controller 138 may determine that the device characteristics 160 may not include the characteristics of the radio 128 and the body camera 132. In some implementations, the hub controller 138 may determine that the device characteristics 160 for the radio 128 and the body camera 132 have not been updated in a threshold period of time. The threshold period of time for the device characteristics 160 may be different than the threshold period of time for the device functions 140. For example, the threshold period of time for the device characteristics 160 may be two hours while the threshold period of time for the device functions 140 may be two weeks.

The hub controller 138 may generate a characteristics request 110 and provide the characteristics request 110 to the communications interface 146 along with instructions to provide the characteristics request 110 to the radio 128. The communications interface 146 transmits the characteristics request 110 to the radio 128. The communications interface 116 receives the characteristics request 110 and provides the characteristics request 110 to the radio controller 114. The radio controller 114 determines that the characteristics of the radio 128 include the battery 118 being at twenty percent capacity. The radio controller 114 may generate the characteristics response 124 that indicates these characteristics. In some implementations, the radio controller 114 may access the sensor data generated by the radio sensors 112 in response to receiving the characteristics request 110. For example, the radio controller 114 may determine a location of the radio 128, the movement of the radio 128, and/or any other similar environmental conditions of the radio 128. The radio controller 114 may include those conditions in the characteristics response 124.

The radio controller 114 may provide characteristics response 124 to the communications interface 116 that then provides the characteristics response 124 to the communications interface 146 of the mobile phone 162. The hub controller 138 stores the characteristics response 124 in the device characteristics 160. The device characteristics 160 then indicate that the radio 128 has twenty percent capacity remaining in the battery.

The hub controller 138 may generate a characteristics request 182 and provide the characteristics request 182 to the communications interface 146 along with instructions to provide the characteristics request 182 to the body camera 132. The communications interface 146 transmits the characteristics request 182 to the body camera 132. The communications interface 164 receives the characteristics request 182 and provides the characteristics request 182 to the body camera controller 168. The body camera controller 168 determines that the characteristics of the body camera 132 include the battery 178 being at ninety percent capacity. The body camera controller 168 may generate the characteristics response 184 that indicates these characteristics. In some implementations, the body camera controller 168 may access the sensor data generated by the body camera sensors 166 in response to receiving the characteristics request 182. For example, the body camera controller 168 may determine a location of the body camera 132, the movement of the body camera 132, and/or any other similar environmental conditions of the body camera 132. The body camera controller 168 may include those conditions in the characteristics response 184.

The body camera controller 168 may provide characteristics response 184 to the communications interface 164 that then provides the characteristics response 184 to the communications interface 146 of the mobile phone 162. The hub controller 138 stores the characteristics response 184 in the device characteristics 160. The device characteristics 160 then indicate that the body camera 132 has ninety percent capacity remaining in the battery.

The hub controller 138 determines that the device characteristics 160 and the device functions 140 are up to date and include data that corresponds to the devices in the device identifiers 152. Based on this determination and in stage C, the hub controller 138 may instruct the function selector 150 to determine whether to activate and/or deactivate any of the functions of the devices communicating with the mobile phone 162. The function selector 150 may analyze the device functions 140 and may also analyze the device characteristics 160 to determine whether to activate and/or deactivate any of the device functions.

The process that the function selector 150 may utilize to determine whether to activate and/or deactivate any of the device functions will be discussed in more detail with respect to FIG. 2. To summarize, the function selector 150 may use one or more models and/or rules to analyze the device functions 140 and the device characteristics 160. In some implementations, the function selector 150 may also analyze the hub sensor data generated by the hub sensors 148. In some implementations, the device characteristics 160 may include the radio sensor data generated by the radio sensors 112 and/or the body camera sensor data generated by the body camera sensors 166. The rules may specify how to compare the device functions 140, the device characteristics 160, and/or the hub sensor data. The rules may include various thresholds and/or ranges to compare to the device functions 140, the device characteristics 160, and/or the hub sensor data. Based on how those thresholds and/or ranges compare to the device functions 140, the device characteristics 160, and/or the hub sensor data, the rules may specify to activate and/or deactivate specific functions of specific devices. The models may be configured to receive the device functions 140, the device characteristics 160, and/or the hub sensor data and output data indicating which of the functions of the connected devices should be active and/or which of the functions of the connected device should be deactivated.

As illustrated in the example of FIG. 1, the function selector 150 may access the device functions 140. The device functions 140 may indicate that the radio 128 is configured to capture audio, output audio, communicate using RF communications, and communicate using short range radio. The device functions 140 may also indicate that the body camera 132 is configured to capture audio, capture video, communicate using Wi-Fi, and communicate using short range radio. The function selector 150 may analyze the device functions 140 and determine that both the radio 128 and the body camera 132 are capable of capturing audio and communicating using short range radio. The function selector 150 may determine because both the radio 128 and the body camera 132 are in the same vicinity, that is on the body of the user 130, it may be unnecessary for both the radio 128 and the body camera 132 to be capturing audio at the same time. This may occur if the user 130 is using both the body camera 132 and the radio 128 at the same time.

Based on determining that it may be unnecessary for both the radio 128 and the body camera 132 to be capturing audio at the same time, the function selector 150 may determine whether one of the devices should deactivate its microphone if both devices are active. In some implementations, the function selector 150 may select a device for deactivating its microphone based on analyzing the device functions 140 using the rules and/or models. In some implementations, the function selector 150 may select a device for deactivating its microphone based on analyzing the device functions 140, the device characteristics 160, and/or the context data from the context determiner 154 using the rules and/or models. In this case, the function selector 150 may determine for the body camera 132 to keep its microphone active and for the radio 128 to deactivate its microphone during instances when both would normally be active.

In stage D, the function selector 150 may generate instructions for the radio 128 and the body camera 132 based on the planned functionality of the microphones 104 and 172. The radio microphone instruction 126 may indicate for the radio controller 114 to deactivate the microphone 104 if the body camera microphone 172 is also active. The body camera microphone instruction 180 may indicate for the body camera controller 168 to maintain the microphone 172 as active during typical operation of the body camera 132 and to provide an indication to the active microphone 172 to the mobile phone 162. Upon receipt of that indication, the hub controller 138 may indicate to the radio 128 to deactivate the microphone 104. When the body camera microphone 172 is deactivated, as may be the case if the body camera 132 is not recording, then the body camera 132 may provide an indication to the mobile phone 132 that the microphone 172 is not capturing audio. Upon receipt of that indication, the hub controller 138 may indicate to the radio 128 to resume normal operation of the microphone 104, which may include activating the microphone 104 if the user 130 presses a button on the radio 128 that activates the microphone 104.

If the user 130 presses on that button when the radio 128 is instructed not to activate the microphone 104, then the radio controller 114 may transmit an indication to the mobile phone 162 that the microphone button has been pressed. The hub controller 138 may request that the microphone 172 of the body camera 132 provide the audio data captured by the microphone 172 to the mobile phone 162. The mobile phone 162 may output the captured audio to the radio 128. The radio 128 may output the captured audio as if the microphone 104 captured the audio. In some implementations, the mobile phone 162 may output the captured audio to a destination specified by the radio 128. The radio 128 may specify a destination to the mobile phone 162 in response to receiving the microphone instruction 126.

The radio 128, and the body camera 132 may store data indicating the status of their various functions. The radio 128 may include the function status 120. The function status 120 may be located in a storage device that is accessible by the radio controller 114 and/or other components of the radio 128. The function status 120 may include the status of each of the functions of the radio 128. For example, the function status 120 may include the microphone status 122 that indicates that the microphone is inactive. In some implementations, the microphone status 122 may include additional instructions for determining when the microphone should be inactive. As noted above, these situations may include instances when the microphone 172 of the body camera 132 is active.

The body camera 132 may include the function status 176. The function status 176 may be located in a storage device that is accessible by the body camera controller 168 and/or other components of the body camera 132. The function status 176 may include the status of each of the functions of the body camera 132. For example, the function status 176 may include the microphone status 174 that indicates that the microphone is active. In some implementations, the microphone status 174 may include additional instructions related to when and/or how the body camera controller 168 should indicate that the microphone 172 is active. As noted above, this may include the body camera controller 168 providing an indication to the mobile phone 162 that the microphone 172 has changed from an inactive status to active status and/or from an active status to an inactive status.

The mobile phone 162 may also store data indicating the status of the component of the devices connected to the mobile phone 162. In addition to data indicating the various function of the connected device, the device functions 140 may also include status data that indicates the current status of the various components. For example, the device functions 140 may include body camera microphone status data 142 that indicates that the microphone 172 of the body camera 132 is active. The device functions 142 may include radio microphone status data 144 that indicates the microphone 104 of the radio 128. In some implementations, the device functions 140 may include a real time status of the various components. For example, the radio microphone status data 144 may indicate that the microphone 104 is currently inactive because the microphone 172 is detecting audio. In some implementations, the device functions 140 may include the instructions provided to the various devices. For example, the body camera microphone status data 142 may indicate that the body camera controller 168 should provide, to the mobile phone 162, an indication that the microphone 172 has transitioned from active to inactive or inactive to active.

In some implementations, the hub controller 138 may be configured to determine whether the mobile phone 162 should operate as the hub and/or receive instructions to begin or cease operating as the hub. The hub controller 138 may store the status of the mobile phone 162 as the hub. The hub controller 138 may be configured to analyze the context data from the context determiner 154, the sensor data from the hub sensors 148, and/or any other characteristics of the mobile phone 162. These other characteristics may include a remaining capacity of the battery 156 as well as other characteristics such as signal strength of the communications interface 146. In some implementations, the hub controller 138 may be configured to determine which other candidate devices are available to act as the hub. In this case, the hub controller 138 may output requests using the communications interface 146 that request responses from other devices in the vicinity. Based on the responses received, the hub controller 138 may determine whether any of those devices are suitable candidates. In some instances, the hub controller 138 may request data from the candidate devices. The requested data may include data collected from any sensors of the candidate devices and/or any other characteristics of the candidate devices. Based on analyzing the requested data, the context data from the context determiner 154, the sensor data from the hub sensors 148, and/or any other characteristics of the mobile phone 162, the hub controller 138 may determine which device should act as the hub. The hub controller 138 may provide an indication of that determination to the selected device. If the hub controller 138 determines that the mobile phone 162 should remain as the hub, the hub controller 138 may provide an indication of that determination to the candidate devices.

In some implementations, the mobile phone 162 may not be designated as the hub. In this case, the other device that is designated as the hub may perform similar actions as those described above with respect to the mobile phone 162. For example, the other device may manage the functions of various devices and/or determine whether another device should operate as the hub.

The mobile phone 162 may include a hub status 136 that indicates whether the mobile phone 162 is operating as the hub. In the example of FIG. 1, the mobile phone 162 is operating as the hub. In this case, the mobile phone hub status 134 may be set to active. If another device is operating as the hub, then the mobile phone hub status 134 may indicate inactive. If the mobile phone hub status 134 is inactive, then the mobile phone 162 may not perform any of the hub related activities such as managing functions of other devices. The mobile phone 162 may also operate as a connected device, such as the radio 128 and the body camera 132, by communicating with the hub. In this case, the hub may control the functions of the mobile phone 162.

Figure 2:
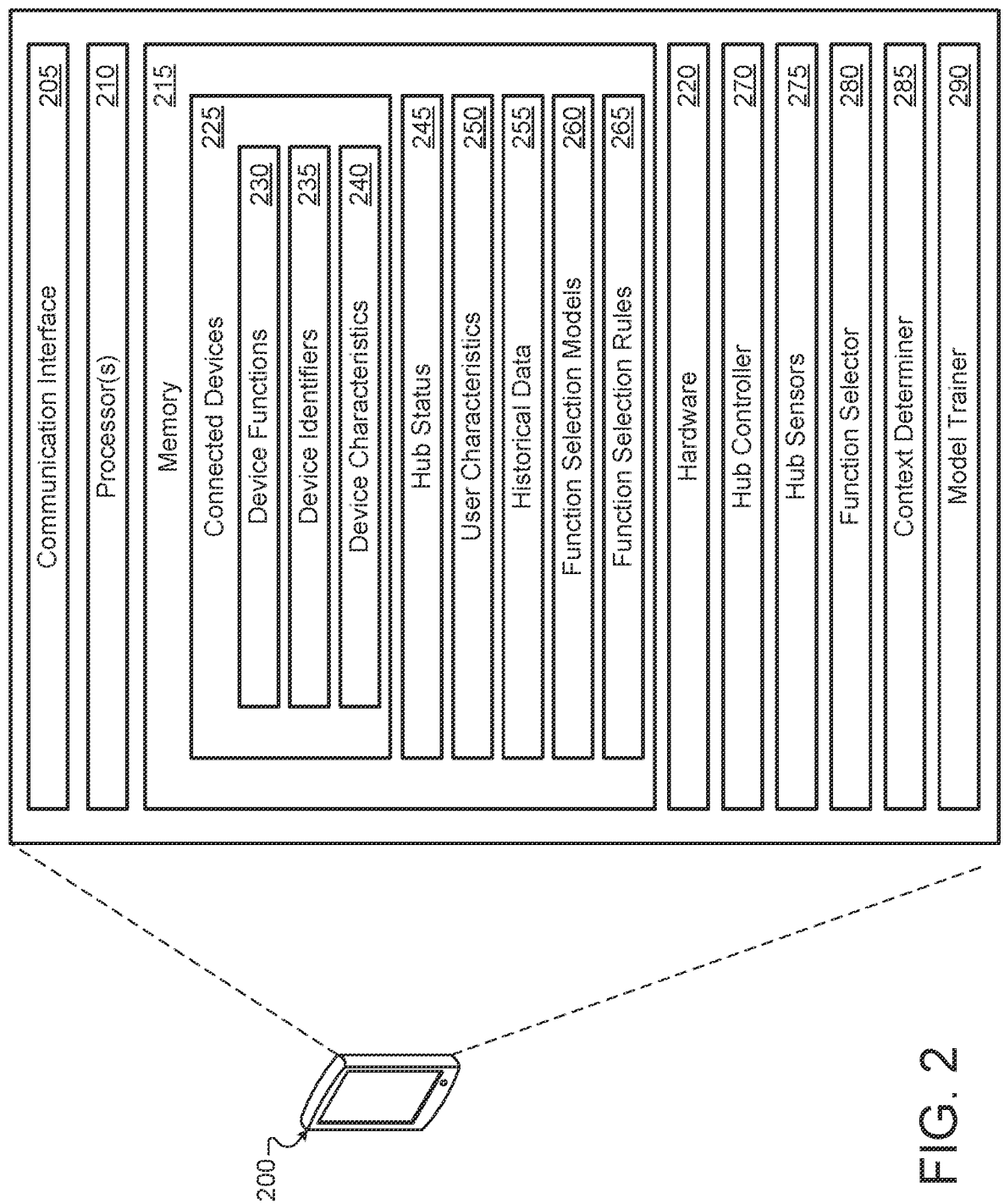
FIG. 2 illustrates an example server that is configured to manage the functionality of various devices.

FIG. 2 illustrates an example device 200 that is configured to manage the functionality of various devices. The device 200 may be any type of computing device that is configured to communicate with other computing devices. The device 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The device 200 may be similar to the mobile phone 162 of FIG. 1. Some of the components of the device may be implemented in a single computing device or distributed over multiple computing devices. Some of the components may be in the form of virtual machines or software containers that are hosted in a cloud in communication with disaggregated storage devices.

The device 200 may include a communication interface 205, one or more processors 210, memory 215, and hardware 220. The communication interface 205 may include communication components that enable the device 200 to transmit data and receive data from other devices and networks. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a hub controller 270. The hub controller 270 may be similar to the hub controller 138 of FIG. 1. The hub controller 270 may be configured to perform multiple tasks. Those tasks may include managing the components of the device 200. For example, the hub controller 270 may instruct the communications interface 205 what type of connection to use to communicate with other devices. The hub controller 270 may instruct the communications interface 205 to communicate with a first device using short range radio and communicate with a second device using a cellular network. The tasks of the hub controller 270 may also include determining whether the device 200 should operate as the hub. The hub may be the device that provides instructions to other devices regarding what functions should be active on those devices and when those functions should be active. If the device 200 is not operating as the hub, then the device 200 may receive instructions regarding what functions of the device should be active and when those functions should be active.

The hub may change between various devices. There may be several devices that are capable of operating as the hub. Each user may have a group of devices with which the user interacts. For example, a police officer may have a radio, body camera, mobile phone, laptop computer, storage device, watch, tablet, a built-in computer of a vehicle, and/or any other similar device. Only some of these devices may be configured to operate as a hub. The mobile phone, vehicle computer, and/or laptop computer may be capable of operating as the hub. Each of these devices may include a hub controller that is similar to the hub controller 270.

To select the hub, each of the devices may have a series of rules and a hierarchy to determine which device should be the hub and/or determine which devices should not be the hub. The rules may relate to whether each device can detect other devices. The rules may also relate to the characteristics of each device such as the battery capacity. An example rule may indicate that if the hub controller 270 determines that the device 200 can communicate with each of the devices of the user, then the hub should be the device 200 unless the battery capacity is below thirty percent. If the battery capacity is below thirty percent, then the hub should be the built-in computer of the vehicle. Another example rule may indicate that if the hub controller 270 determines that the device 200 can communicate with each of the devices of the user, then the hub should be the built-in computer of the vehicle.

If the device 200 is operating as the hub, then the device 200 may operate as a gateway for communications between the devices and another network. The device 200 or another device acting as the hub may operate as a gateway according to instructions from the function selector 280. For example, the hub controller 270 may instruct a connected device to cease communicating over Wi-Fi and a cellular network and communicate with the device 200 using short range radio. The communications interface 205 may receive the communications from the connected device over short range radio and output the communications using another communications technique to the recipient. Similarly, the communications interface 205 may receive communications intended for the connected device and provide those communications to the connected device over short-range radio.

The status of whether the device 200 is operating as the hub may be located in the hub status 245. The hub status 245 may be located in the memory 215 of the device 200. The hub status 245 may include data indicating whether the device 200 is operating as the hub. If the status data indicates that the device 200 is not operating as the hub, then the hub status 245 may include data identifying the device operating as the hub.

The device 200 may include hub sensors 275. The hub sensors 275 may be similar to the hub sensors 148 of FIG. 1. The hub sensors 275 may include an accelerometer, a gyroscope, a GPS receiver, a barometer, an ambient light sensor, a compass, a gravity sensor, a proximity sensor, a magnetometer, image sensor, video sensor, microphone, hygrometer, water sensor, solar flux sensor, ultraviolet light detector, and/or any other similar sensors. The hub sensors 275 may continuously generate sensors data, generate sensor data in response to an instruction from the hub controller 138, generate sensor data in response to an instruction from another device acting as the hub, generate sensor data periodically, generate sensor data in response to an event such as other sensor data satisfying a threshold, and/or generate sensor data in any other similar instance.

The memory 215 may include the connected devices storage 225. The connected devices storage 225 may be similar to the connected devices storage 158 of FIG. 1 In the case of the device 200 acting as the hub, the device 200 may be managing the connected devices. In the case of the device 200 not acting as the hub, the device 200 may store data related to the devices that the device 200 previously managed when the device 200 was acting as the hub. The connected devices storage 225 may also include instructions received from the hub. These instructions may include how and when to use various functions of the device 200.

The connected devices storage 225 may include the device functions 230, the device identifiers 235, and the device characteristics 240 that may be similar to the device functions 140, the device identifiers 152, and the device characteristics 160 of FIG. 1, respectively. The device identifiers 235 may store an identifier of the devices that the device 200 is configured to manage and identifiers of other devices that may be designated as the hub. The device 200 may mange devices that may later be designated as the hub.

The device characteristics 240 may store data related to the devices included in the device identifiers 235. The device characteristics 240 may include data related to features or qualities of the connected devices that may change over time. This change may occur because of usage of the device, movement of the device, environmental changes, changes in nearby devices, and/or any other similar change. In some implementations, the device characteristics 240 may include sensor data generated by sensors of the connected devices. In some implementations, the connected devices may provide the device characteristics periodically, in response to a request from the device 200, in response to an event, and/or any other similar reason. In some implementations, the device characteristics 240 may be unrelated to changes in the device that may occur because of hardware and/or software changes.

The device functions 230 may store data related to the devices included in the device identifiers 235. The device functions 230 may be similar to the device functions 140 of FIG. 1. The device functions 230 may include data related to the capabilities of the connected devices that may not change without a modification or addition to the hardware and/or software of the device. The device functions 230 may be related to the communications abilities of the devices, the types of sensors included in the device, and/or any other similar type of capability. The device functions 230 may also include data related to the quality of the functions of each device. For example, if the function is audio capture, then the quality may relate to the bitrate, sampling rate, and/or any other similar quality metric audio capture. If the function is video capture, then the quality may relate to resolution, framerate, and/or any other similar quality metric for video capture. If the function is wireless or wired communications, then the quality may relate to the bandwidth and/or any other similar quality metric for wireless or wired communications.

The device functions 230 may also include instructions for each of the functions for each connected device. The instructions may relate to when the function should be active as specified by the function selector 280 and any other actions that the connected device should take related to that function. Some functions may be controlled by the corresponding device because the function selector 280 has not provided any instructions or the function selector 280 has cancelled previous instructions. For example, a body camera may control its camera as it normally would. The device functions 230 may also include data related to when an instruction was provided to a connected device, whether the connected device confirmed the instruction, whether the connected device appears to be complying with the instruction, and/or any other information related to the functions.

The memory 215 may include a user characteristics 255. The user characteristics 255 may include data that describe the type of user who is using the device 200 and the connected devices. The type of user may include an occupation of the user, demographic information of the user, an employer of the user, and/or any other similar information. In some implementations, the user may provide the user characteristics 255 to the device 200. The user may provide the user characteristics 255 in response to prompts from the device 200.

The one or more processors 205 may implement a context determiner 285. The context determiner 285 may be similar to the context determiner 154 of FIG. 1. The context determiner 285 may be configured to determine a context of the device 200 and/or any of the connected devices. The context determiner 285 may be configured to analyze the sensor data generated by the hub sensors 275 and/or sensor data generated by sensors of any of the connected devices.

The context determiner 285 may also be configured to determine events that may be occurring near or around the device 200 and/or connected devices. The context determiner 285 may determine events by analyzing news sources, websites, internet locations with current event information, first responder dispatch feeds, and/or any other similar information source. In some implementations, the context determiner 285 may access communications between the device 200 and other devices and other communications between the user of the device 200 and other users. The context determiner 285 may analyze these various sources of information and determine the context of the device 200 and/or any connected device.

The one or more processors 205 may implement a function selector 280. The function selector 280 may be similar to the function selector 150 of FIG. 1. The function selector 280 may be configured to analyze the device functions 230, the device characteristics 240, the sensor data from the hub sensors 275, the sensor data from the connected devices, the context, the user characteristics 250, and/or any other similar data to determine whether any function of the connected devices should operate differently than how that function typically operates. The function selector 280 may use the function selection models 260 and/or the function selection rules 265 to analyze these data sources. The function selection models 260 and/or the function selection rules 265 may output data identifying one or more functions of the connected devices and data indicating how those functions should operate. The function selector 280 may output those instructions to the corresponding connected device.

The function selection rules 265 may include various thresholds, ranges, hierarchies, and/or any other similar comparison tools to determine how the functions of the connected devices should operate. An example rule may indicate to identify the connected devices that are capable of performing the same function. The rule may indicate for the device with the higher battery capacity to perform the function if both devices would otherwise be performing that function. For example, a body camera and a radio may both have a microphone. The radio may have more battery capacity. If the body camera receives a request to begin capturing audio and the radio has not received a request to begin capturing audio, then the body camera may continue to capture the audio. If the body camera receives a request to begin capturing audio and the radio has received a request to begin capturing audio or is capturing audio, then the body camera may bypass capturing the audio. The hub controller 270 may coordinate the operation of these functions by requesting that the connected devices notify the hub controller 270 when the connected device receives a request to start or stop using one of these functions. The function selector 150 may continuously analyze the device functions 230, the device characteristics 240, the sensor data from the hub sensors 275, the sensor data from the connected devices, the context, the user characteristics 250, and/or any other similar data to determine whether any of the instructions provided to the connected devices should be updated. For example, this updating may occur if battery capacity changes.

A similar rule may indicate for the device with the higher battery capacity to perform the function even if both devices would not be performing the function. Following the body camera and radio example, the radio may have more battery capacity. If the body camera receives a request to begin capturing audio and the radio has not received a request to begin capturing audio, then the body camera may bypass capturing audio and the radio may begin capturing audio on behalf of the body camera. In this case, the radio may provide the captured audio to the hub controller 270 and the hub controller 270 may output the audio captured by the radio and provide the captured audio to the location or device where the body camera would provide the audio if the body camera captured the audio. If the body camera receives a request to begin capturing audio and the radio has received a request to begin capturing audio or is capturing audio, then the body camera may bypass capturing the audio. The radio may begin capturing audio for both the body camera and the radio. The radio may transmit the audio to the device that the radio would typically send the audio and to the hub controller 270. The hub controller 270 may provide the audio to the location or device where the body camera would provide the audio if the body camera captured the audio.

Another example rule may be related to ensuring that the highest quality audio, video, image, or other data is collected. The rule may specify for the image sensor with the highest resolution to capture the video and/or images. In this case, the communication between the devices may be similar to that described above with respect to the audio capturing. In other words, the hub controller 270 may manage when image sensors may be activated or bypass being activated.

Another example rule may be related to device 200 acting as a communication hub for the connected devices. The rule may state that the connected devices should communicate with the device 200 using short range radio and the device 200 may transmit communications from the connected devices and receive communications for the connected devices. The device 200 may use higher power communications such as cellular communications. In other words, the device 200 acts as a communication hub for the connected devices because the device 200 communicates on behalf of the connected devices.

In some implementations, this rule may also include references to the battery power of the connected devices and/or the device 200. For example, the rule may not apply if the battery capacity of the connected device is above sixty percent. As another example, the rule may not apply if the battery capacity of the device 200 is below forty percent. As another example, the rule may apply if the device 200 has a hardwired power supply. As another example, the rule may not apply if the signal strength of the device is below a threshold signal strength. As another example, the rule may indicate that one of the connected devices or the device 200 should operate as the communication hub if one of the connected devices or the device 200 has a signal strength that is above a threshold and the other devices have a signal strength that is below a threshold. This rule may be valid for devices that are capable of communicating with additional devices that the ones that the devices are intended to communicate with.

The function selection models 260 may be configured to receive the device functions 230, the device characteristics 240, the sensor data from the hub sensors 275, the sensor data from the connected devices, the context, the user characteristics 250, and/or any other similar data. The function selection models 260 may output data indicating a function of a connected device to adjust and how to adjust that function. The function selection models 260 may be trained using machine learning and the historical data 255. The historical data 255 may include previous sensor data collected from the hub sensors, previous sensor data collected from the sensors of the connected devices, previous contexts, previous user characteristics, and/or any other similar data. The historical data 255 may also include data related to instances when the device 200 or another hub may have been managing the functions of the connected devices and/or periods when the functions of devices may otherwise be limited or unavailable.

The one or more processors 205 may implement the model trainer 290. The model trainer 290 may be configured to analyze the historical data 255. The model trainer 290 may train the function selection models 260 using the historical data 255 and machine learning. The model trainer 290 may generate various data samples based on the historical data 255. Each data sample may indicate the state of the previous sensor data collected from the hub sensors, previous sensor data collected from the sensors of the connected devices, previous contexts, previous user characteristics, and/or any other similar data at a point in time. Each data sample may also include a label that indicates the state of the various functions of the connected devices and how the devices were communicating with each other and/or with other devices and networks. The resulting models may be able to receive device functions 230, the device characteristics 240, the sensor data from the hub sensors 275, the sensor data from the connected devices, the context, the user characteristics 250, and/or any other similar data and output data indicating which functions should be active or inactive, how the connected devices should communicate with the device 200 and/or with other devices, which device should operate as the hub, and/or any other similar recommendation.

In some implementations, the function selector 280 may implement the recommendation. The model trainer 290 may continue to collect the historical data 255 as the device 200 operates. In this case, the model trainer 290 may update the historical data 255 and retrain the function selection models 260 using the updated historical data 255 and machine learning. The function selector 280 may utilize the updated function selection models 260 to analyze the device functions 230, the device characteristics 240, the sensor data from the hub sensors 275, the sensor data from the connected devices, the context, the user characteristics 250, and/or any other similar data that may have updated since the last analysis.

The model trainer 290 may also be configured to analyze the historical data 255 and generate the function selection rules 265. The model trainer 290 may analyze the historical data 255 for patterns to identify ranges and threshold and other similar comparison techniques to use to analyze the device functions 230, the device characteristics 240, the sensor data from the hub sensors 275, the sensor data from the connected devices, the context, the user characteristics 250, and/or any other similar data. In some implementations, the model trainer 290 may receive goals from a user that the model trainer 290 should try to achieve when generating the function selection rules 265. For example, the goals may include preserving battery life, ensuring image resolution is above a threshold a certain percentage of the time, ensuring the framerate is above a threshold a certain percentage of the time, and/or any other similar goal. In addition to relating to functions, the function selection rules 265 may be related to selecting a device for a hub. In some implementations, the device 200 may also receive function selection rules 265 from a user. These rules may be also be related to specific goals of the user and may be specifically tailored for particular devices.

Figure 3:
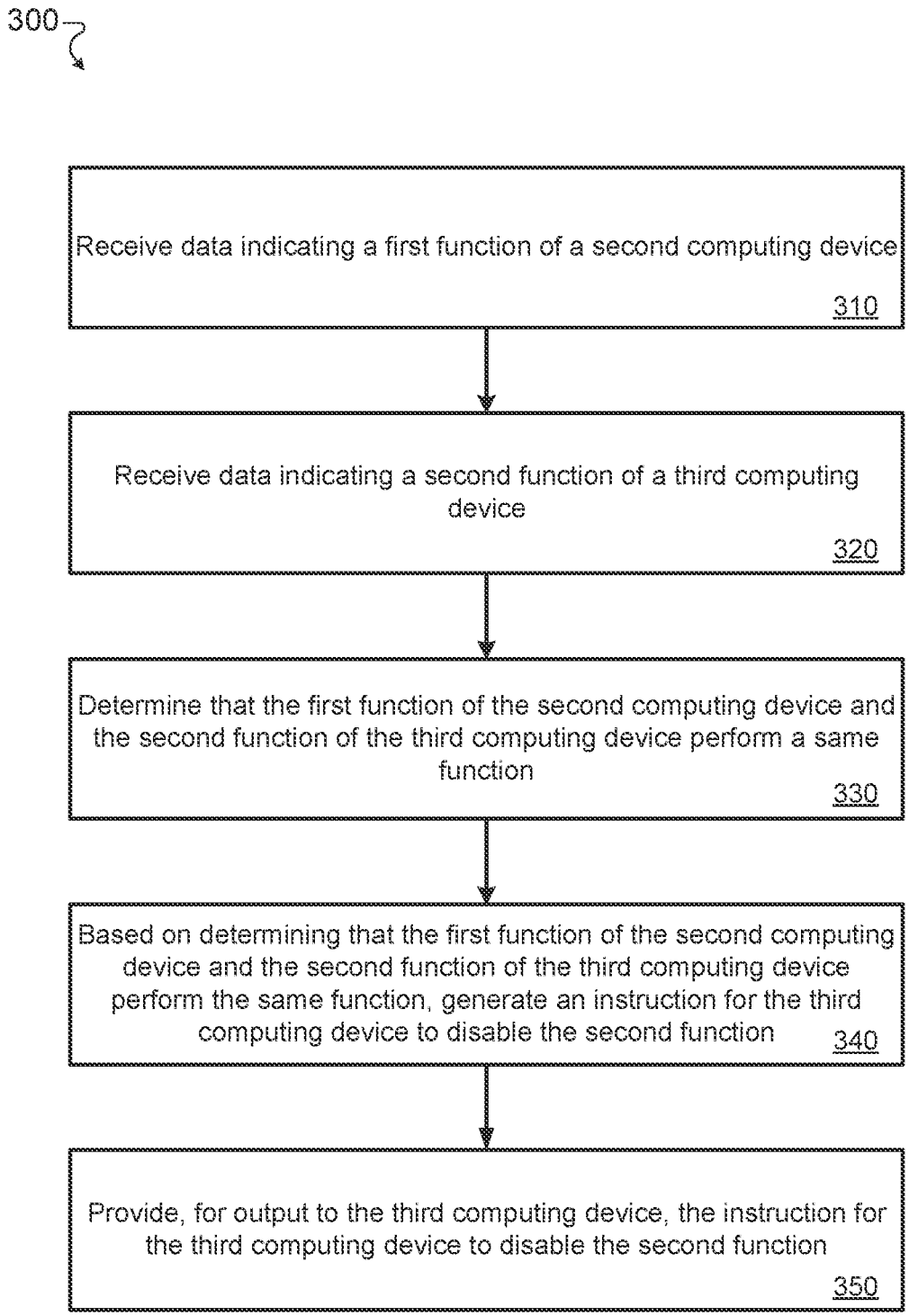
FIG. 3 is a flowchart of an example process for managing the functionality of various devices.

FIG. 3 is a flowchart of an example process 300 for managing the functionality of various devices. In general, the process 300 determines the functions that various devices are capable of performing. The process 300 determines that some of those functions are the same function. Based on that determination, the process 300 may instruct one of the devices to cease performing that function in order to prevent that device and another device from performing redundant functions. The process 300 will be described as being performed by the mobile phone 162 of FIG. 1 and will include references to other components in FIG. 1. The process 300 may also be performed by the device 200 of FIG. 2.

The mobile phone 162 receives data indicating a first function of a second computing device (310). In some implementations, the first function may be related to actions that the hardware and/or software of the second computing device can perform. For example, the first function may be capturing audio, capturing images, capturing video, communicating using RF communications, communicating using short-range radio, communicating using infrared, communicating using Wi-Fi, communicating using a cellular network, detecting temperature, detecting acceleration, detecting motion, detecting location, detecting pressure, detecting ambient light, detecting cardinal direction, detecting gravity, detecting the proximity of objects, detecting magnetic fields, detecting water, detecting solar flux, detecting ultraviolet light, and/or performing any other similar function. In some implementations, the second computing device may be any type of device that is capable of communicating with the mobile phone 162 and/or other devices.

The mobile phone 162 receives data indicating a second function of a third computing device (320). The second function of the third computing device may be similar to the first function of the second computing device because the second function may be related to actions that the hardware and/or software of the third computing device can perform. In some implementations, the third computing device may be any type of device that is capable of communicating with the mobile phone 162 and/or other devices.

The mobile phone 162 determines that the first function of the second computing device and the second function of the third computing device perform a same function (330). The mobile phone 162 may make this determination by comparing the input and/or output of the functions, the initialization process for the function, the termination process for the function, and/or any other similar aspect of the functions. For example, the mobile phone 162 may determine that the second and third computing devices both perform audio capture. The mobile phone 162 may determine that the second and third computing devices both perform communications over short-range radio.

Based on determining that the first function of the second computing device and the second function of the third computing device perform the same function, the mobile phone 162 generates an instruction for the third computing device to disable the second function (340). The mobile phone 162 provides, for output to the third computing device, the instruction for the third computing device to disable the second function (350). In some implementations, the instruction to disable the second function may indicate for the second function to remain inactive until the mobile phone 162 provides an instruction to the third computing device to return the second function to normal operation. For example, the instruction may be for the microphone to remain inactive until receipt of an instruction for the microphone to return to normal operation. In some implementations, the instructions may indicate for the third computing device to indicate to the mobile phone 162 when the second function would begin and/or end. For example, the third computing device may indicate to the mobile phone 162 when the third computing device would activate the microphone but does not because of the instruction for the microphone to remain inactive. In this case, the mobile phone 162 may transmit an instruction to the second computing device to activate the microphone. The second computing device can provide the audio data to the mobile phone 162. The mobile phone 162 can provide the audio data to the appropriate location, or the mobile phone 162 can provide the audio data back to the third computing device.

In some implementations, the instruction to disable the second function may not be an instruction to prevent activation of the function. Instead, the instruction may be for the third computing device request permission from the mobile phone 162 to activate. In this case, the goal may be to prevent multiple devices from performing the same function at the same time. If neither is performing the function, then one of them can activate the function. If both are performing the function, then the mobile phone 162 specifies in the instructions whether the device should defer to the other device and deactivate the function. For example, the third computing device may indicate to the mobile phone 162 when the third computing device would activate the microphone. The mobile phone 162 may determine whether the second computing device has an active microphone. If so, then the mobile phone 162 may instruct the third computing device to not activate the microphone. If not, then the mobile phone 162 may permit the third computing device to proceed with activating the microphone. The mobile phone 162 may also instruct the second computing device to notify the mobile phone 162 regarding the status of the microphone of the second computing device and provide the audio data of the microphone to the mobile phone 162, if instructed.

As described above, the mobile phone 162 may also provide notice to the second computing device regarding the third computing device receiving instructions to disable or modify the performance of the second function. The notice may indicate for the second computing device to provide an indication to the mobile phone 162 when the function is transitioning from active to inactive and from inactive to active. The notice may also indicate for the second computing device to provide data generated by the function upon a request from the mobile phone 162.

In some implementations, the mobile phone 162 may receive the characteristics of the second and third computing devices. The characteristics may be related to the aspects of the devices that change more frequently than the functions. In some implementations, the characteristics may be related to the aspects of the devices that are not related to the devices performing an action. In some implementations, the device functions may be related to the functions of the devices that may change with changes in hardware and/or software, and the device characteristics may be other aspects of the devices that may change without changes in hardware and/or software. In some implementations, the characteristics may be related to the functions. For example, the characteristics may relate to the resolution of a camera, a framerate of a video sensor, a sampling rate of a microphone, a resolution of the microphone, a bandwidth of a communication channel, the signal strength of a communication signal, and/or any other similar aspect of a function. In some implementations, the function characteristics may change over time. For example, the signal strength may increase and decrease as the environment of the devices changes and/or the devices move.

The mobile phone 162 may use both the characteristics and the functions to determine whether to deactivate or modify the performance of the second function of the third computing device. For example, the mobile phone 162 may select the device to perform the function based on which device has the most battery capacity remaining. In some implementations, the characteristics of the devices may change over time. This may cause the mobile phone to change which device is performing the function. For example, the mobile phone 162 may determine that the battery capacity of the second computing device has dropped below the battery capacity of the third computing device. In this case, the mobile phone 162 may switch the device performing the function so that the third computing device is performing the function and the second computing device is requesting permission and/or not performing the function.

In some implementations, the mobile phone 162 may determine the context of the mobile phone 162, the second computing device, and/or the third computing device. The mobile phone 162 may analyze sensor data collected from the mobile phone 162, the second computing device, and/or the third computing device, weather information, news information, traffic information, event information, and/or any other similar data source. Based on this analysis, the mobile phone 162 may determine the context. The mobile phone 162 may utilize the context to assist in selecting which device should perform the function.

In some implementations, the mobile phone 162 may determine to instruct another device to operate as the hub. In some implementations, the mobile phone 162 may receive an instruction to cease operating at the hub. The mobile phone 162 and/or the instructing device may make this determination based on the characteristics, functions, and/or context of the mobile phone 162 and/or the other devices that may operate as the hub. For example, the mobile phone 162 may determine to switch the hub to a built-in computer of a vehicle if the mobile phone 162 determines that the built-in computer of the vehicle is able to communicate with the first and second computing devices and the mobile phone 162. This determination may be based on the built-in computer of the vehicle not running on a battery like the mobile phone 162. In some implementations, the mobile phone 162 may request that the mobile phone 162 return to being the hub if the mobile phone 162 is charging and the battery capacity is greater than sixty percent and the mobile phone 162 is able to communicate with the first and second computing devices.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method, comprising:
receiving, by a first computing device, data indicating a first function of a second computing device;
receiving, by the first computing device, data indicating a second function of a third computing device;
determining, by the first computing device, that the first function of the second computing device and the second function of the third computing device perform a same function;
receiving, by the first computing device, at least one function selection rule including:
ensuring an image resolution is greater than a first threshold, or
ensuring a frame rate of a video is greater than a second threshold;
based on determining that the first function of the second computing device and the second function of the third computing device perform the same function, generating, by the first computing device according to the at least one function selection rule, an instruction for the third computing device to disable the second function; and
providing, for output by the first computing device and to the third computing device, the instruction for the third computing device to disable the second function.

2. The method of claim 1, comprising:
based on providing, for output to the third computing device, the instruction for the third computing device to disable the second function, generating, by the first computing device, a notification for the second computing device indicating that the third computing device received an instruction to disable the second function that performs the same function as the first function of the second computing device.

3. The method of claim 1, comprising:
receiving, by the first computing device, data indicating first characteristics of the second computing device and data indicating second characteristics of the third computing device; and
based on the first characteristics of the second computing device, the second characteristics of the third computing device, and determining that the first function of the second computing device and the second function of the third computing device perform the same function, determining, by the first computing device, to generate the instruction for the third computing device to disable the second function.

4. The method of claim 1, comprising:
receiving, by the first computing device, data indicating first characteristics of the second computing device and data indicating second characteristics of the third computing device;
based on the first characteristics of the second computing device, the second characteristics of the third computing device, and determining that the first function of the second computing device and the second function of the third computing device perform the same function, determining, by the first computing device, to generate an instruction for the third computing device to enable the second function and an instruction for the second computing device to disable the first function;
providing, for output by the first computing device and to the second computing device, the instruction for the second computing device to disable the first function; and
providing, for output by the first computing device and to the third computing device, the instruction for the third computing device to enable the second function.

5. The method of claim 1, comprising:
determining, by the first computing device, characteristics of the first computing device;
based on the characteristics of the first computing device, determining, by the first computing device, to transfer a function of the first computing device to a fourth computing device; and providing, for output by the first computing device and to the fourth computing device, an instruction for the fourth computing device to begin performing the function.

6. The method of claim 1, comprising:
receiving, by the first computing device, data indicating a third function of the second computing device;
receiving, by the first computing device, data indicating a fourth function of the determining, by the first computing device, that the third function of the second computing device and the fourth function of the third computing device perform a same additional function;
based on determining that the third function of the second computing device and the fourth function of the second computing device perform the same additional function, generating, by the first computing device, an instruction for the third computing device to adjust performance of fourth function; and
providing, for output by the first computing device and to the third computing device, the instruction for the third computing device to adjust performance of the fourth function.

7. The method of claim 1, comprising:
determining, by the first computing device, a context of the first computing device, the second computing device, or the third computing device; and
based on the context of the first computing device, the second computing device, or the third computing device and determining that the first function of the second computing device and the second function of the third computing device perform the same function, determining, by the first computing device, to generate the instruction for the third computing device to disable the second function.

8. A system, comprising:
one or more processors; and
memory including a plurality of computer-executable components that are executable by the one or more processors to perform a plurality of actions, the plurality of actions comprising:
receiving, by a first computing device, data indicating a first function of a second computing device;
receiving, by the first computing device, data indicating a second function of a third computing device;
determining, by the first computing device, that the first function of the second computing device and the second function of the third computing device perform a same function;
receiving, by the first computing device, at least one function selection rule including:
ensuring an image resolution is greater than a first threshold, or
ensuring a frame rate of a video is greater than a second threshold;
based on determining that the first function of the second computing device and the second function of the third computing device perform the same function, generating, by the first computing device according to the at least one function selection rule, an instruction for the third computing device to disable the second function; and
providing, for output by the first computing device and to the third computing device, the instruction for the third computing device to disable the second function.

9. The system of claim 8, wherein the actions comprise:
based on providing, for output to the third computing device, the instruction for the third computing device to disable the second function, generating, by the first computing device, a notification for the second computing device indicating that the third computing device received an instruction to disable the second function that performs the same function as the first function of the second computing device.

10. The system of claim 8, wherein the actions comprise:
receiving, by the first computing device, data indicating first characteristics of the second computing device and data indicating second characteristics of the third computing device; and
based on the first characteristics of the second computing device, the second characteristics of the third computing device, and determining that the first function of the second computing device and the second function of the third computing device perform the same function, determining, by the first computing device, to generate the instruction for the third computing device to disable the second function.

11. The system of claim 8, wherein the actions comprise:
receiving, by the first computing device, data indicating first characteristics of the second computing device and data indicating second characteristics of the third computing device;
based on the first characteristics of the second computing device, the second characteristics of the third computing device, and determining that the first function of the second computing device and the second function of the third computing device perform the same function, determining, by the first computing device, to generate an instruction for the third computing device to enable the second function and an instruction for the second computing device to disable the first function;
providing, for output by the first computing device and to the second computing device, the instruction for the second computing device to disable the first function; and
providing, for output by the first computing device and to the third computing device, the instruction for the third computing device to enable the second function.

12. The system of claim 8, wherein the actions comprise:
determining, by the first computing device, characteristics of the first computing device;
based on the characteristics of the first computing device, determining, by the first computing device, to transfer a function of the first computing device to a fourth computing device; and
providing, for output by the first computing device and to the fourth computing device, an instruction for the fourth computing device to begin performing the function.

13. The system of claim 8, wherein the actions comprise:
receiving, by the first computing device, data indicating a third function of the second computing device;
receiving, by the first computing device, data indicating a fourth function of the determining, by the first computing device, that the third function of the second computing device and the fourth function of the third computing device perform a same additional function;
based on determining that the third function of the second computing device and the fourth function of the second computing device perform the same additional function, generating, by the first computing device, an instruction for the third computing device to adjust performance of fourth function; and providing, for output by the first computing device and to the third computing device, the instruction for the third computing device to adjust performance of the fourth function.

14. The system of claim 8, wherein the actions comprise:
determining, by the first computing device, a context of the first computing device, the second computing device, or the third computing device; and
based on the context of the first computing device, the second computing device, or the third computing device and determining that the first function of the second computing device and the second function of the third computing device perform the same function, determining, by the first computing device, to generate the instruction for the third computing device to disable the second function.

15. One or more non-transitory computer-readable media of a computing device storing computer-executable instructions that upon execution cause one or more computers to perform acts comprising:
receiving, by a first computing device, data indicating a first function of a second computing device;
receiving, by the first computing device, data indicating a second function of a third computing device;
determining, by the first computing device, that the first function of the second computing device and the second function of the third computing device perform a same function;
receiving, by the first computing device, at least one function selection rule including:
ensuring an image resolution is greater than a first threshold, or
ensuring a frame rate of a video is greater than a second threshold;
based on determining that the first function of the second computing device and the second function of the third computing device perform the same function, generating, by the first computing device according to the at least one function selection rule, an instruction for the third computing device to disable the second function; and
providing, for output by the first computing device and to the third computing device, the instruction for the third computing device to disable the second function.

16. The media of claim 15, wherein the acts comprise:
based on providing, for output to the third computing device, the instruction for the third computing device to disable the second function, generating, by the first computing device, a notification for the second computing device indicating that the third computing device received an instruction to disable the second function that performs the same function as the first function of the second computing device.

17. The media of claim 15, wherein the acts comprise:
receiving, by the first computing device, data indicating first characteristics of the second computing device and data indicating second characteristics of the third computing device; and
based on the first characteristics of the second computing device, the second characteristics of the third computing device, and determining that the first function of the second computing device and the second function of the third computing device perform the same function, determining, by the first computing device, to generate the instruction for the third computing device to disable the second function.

18. The media of claim 15, wherein the acts comprise:
receiving, by the first computing device, data indicating first characteristics of the second computing device and data indicating second characteristics of the third computing device;
based on the first characteristics of the second computing device, the second characteristics of the third computing device, and determining that the first function of the second computing device and the second function of the third computing device perform the same function, determining, by the first computing device, to generate an instruction for the third computing device to enable the second function and an instruction for the second computing device to disable the first function;
providing, for output by the first computing device and to the second computing device, the instruction for the second computing device to disable the first function; and
providing, for output by the first computing device and to the third computing device, the instruction for the third computing device to enable the second function.

19. The media of claim 15, wherein the acts comprise:
determining, by the first computing device, characteristics of the first computing device;
based on the characteristics of the first computing device, determining, by the first computing device, to transfer a function of the first computing device to a fourth computing device; and
providing, for output by the first computing device and to the fourth computing device, an instruction for the fourth computing device to begin performing the function.

20. The media of claim 15, wherein the acts comprise:
receiving, by the first computing device, data indicating a third function of the second computing device;
receiving, by the first computing device, data indicating a fourth function of the third computing device;
determining, by the first computing device, that the third function of the second computing device and the fourth function of the third computing device perform a same additional function;
based on determining that the third function of the second computing device and the fourth function of the second computing device perform the same additional function, generating, by the first computing device, an instruction for the third computing device to adjust performance of fourth function; and
providing, for output by the first computing device and to the third computing device, the instruction for the third computing device to adjust performance of the fourth function.

* * * * *